United States Patent
Ding et al.

(10) Patent No.: US 10,682,670 B2
(45) Date of Patent: Jun. 16, 2020

(54) EXCITATION SIGNAL SEQUENCES FOR ULTRASONIC TRANSDUCER

(71) Applicant: TEXAS INSTRUMENTS INCORPORATED, Dallas, TX (US)

(72) Inventors: Lei Ding, Plano, TX (US); Srinath Mathur Ramaswamy, Murphy, TX (US); Baher Haroun, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 138 days.

(21) Appl. No.: 15/675,162

(22) Filed: Aug. 11, 2017

(65) Prior Publication Data
US 2019/0047019 A1 Feb. 14, 2019

(51) Int. Cl.
| | | |
|---|---|---|
| B06B 1/02 | (2006.01) | |
| G01S 7/524 | (2006.01) | |
| B05B 17/06 | (2006.01) | |
| G10K 11/34 | (2006.01) | |
| G01S 15/10 | (2006.01) | |
| G01F 23/22 | (2006.01) | |

(52) U.S. Cl.
CPC ............ *B06B 1/0223* (2013.01); *B05B 17/06* (2013.01); *B06B 1/0215* (2013.01); *B06B 1/0269* (2013.01); *G01F 23/22* (2013.01); *G01S 7/524* (2013.01); *G01S 15/10* (2013.01); *G01S 15/102* (2013.01); *G10K 11/341* (2013.01)

(58) Field of Classification Search
None
See application file for complete search history.

(56) References Cited

U.S. PATENT DOCUMENTS

| | | | |
|---|---|---|---|
| 3,387,257 A | 6/1968 | Brech | |
| 3,409,787 A | 11/1968 | Agalides et al. | |
| 5,087,850 A | 2/1992 | Suzuta | |
| 5,198,713 A | 3/1993 | Suzuta | |
| 5,460,595 A | 10/1995 | Hall et al. | |
| 5,900,690 A * | 5/1999 | Gipson | B06B 1/0246 310/316.01 |
| 6,731,569 B2 * | 5/2004 | Yurchenko | B06B 1/0215 367/138 |
| 2005/0228282 A1 * | 10/2005 | Wang | A61B 8/00 600/453 |
| 2015/0331100 A1 | 11/2015 | Hsu et al. | |
| 2018/0364341 A1 | 12/2018 | Ding et al. | |
| 2019/0033434 A1 | 1/2019 | Ding et al. | |
| 2019/0047019 A1 | 2/2019 | Ding et al. | |

* cited by examiner

*Primary Examiner* — Paul M. West
*Assistant Examiner* — Mark A Shabman
(74) *Attorney, Agent, or Firm* — Michael A. Davis, Jr.; Charles A. Brill; Frank D. Cimino

(57) ABSTRACT

An ultrasonic detection circuit includes a transmitter circuit that provides excitation signals to an ultrasonic transducer during an excitation interval. A control circuit includes a port to receive a command. The control circuit controls the frequency and the duty cycle of the excitation signals of the transmitter circuit during the excitation interval. The control circuit generates a first excitation signal sequence of the excitation interval followed by a first monitoring period to receive a first echo signal in response to the command. The control circuit generates a second excitation signal sequence of the excitation interval followed by a second monitoring period to receive a second echo signal in response to the command. The control circuit outputs results via the port based on at least one of the first or second echo signals received.

15 Claims, 10 Drawing Sheets

US 10,682,670 B2

EXCITATION SIGNAL SEQUENCES FOR ULTRASONIC TRANSDUCER

TECHNICAL FIELD

This disclosure relates to electrical circuits, and more particularly to a control circuit and method to control multiple excitation signal sequences during an excitation interval for an ultrasonic transducer.

BACKGROUND

Ultrasonic transducers convert electrical alternating current (AC) signals into ultrasound, as well as converting ultrasound signals into AC signals. Ultrasonic transducers typically are piezoelectric transducers where piezoelectric crystals change size and shape when a voltage is applied. An applied AC voltage causes them to oscillate at the same frequency and produce ultrasonic sound. The beam pattern of the transducer can be determined by the active transducer area and shape, the ultrasound wavelength, and the sound velocity of the propagation medium such as air. Since piezoelectric materials generate a voltage when force is applied to them, they can also work as ultrasonic detectors. Some systems use a separate transmitter to excite the transducer and receiver to receive reflected ultrasound signal. Other systems combine both transmitter and receiver functions using a single transceiver, where the transducer is excited for a period by the transmitter and then utilized to detect reflected energy from a target after excitation.

SUMMARY

This disclosure relates to a control circuit and method to control multiple excitation signal sequences during an excitation interval for an ultrasonic transducer.

In one example, an ultrasonic detection circuit includes a transmitter circuit that provides excitation signals to an ultrasonic transducer during an excitation interval. A control circuit includes a port to receive a command. The control circuit controls the frequency and the duty cycle of the excitation signals of the transmitter circuit during the excitation interval. The control circuit generates a first excitation signal sequence of the excitation interval followed by a first monitoring period to receive a first echo signal in response to the command. The control circuit generates a second excitation signal sequence of the excitation interval followed by a second monitoring period to receive a second echo signal in response to the command. The control circuit outputs results via the port based on at least one of the first or second echo signals received.

In another example, an ultrasonic detection system includes a transmitter circuit that provides excitation signals to an ultrasonic transducer during an excitation interval. A control circuit includes a port to receive a command. The control circuit controls the frequency and the duty cycle of the excitation signals of the transmitter circuit during the excitation interval. The control circuit generates a first excitation signal sequence of the excitation interval followed by a first monitoring period to receive a first echo pulse in response to the command. The control circuit generates a second excitation signal sequence of the excitation interval followed by a second monitoring period to receive a second echo pulse in response to the command. A system controller generates the command to the control circuit via the port. The system controller receives the results from the control circuit based on at least one of the first or second echo pulses received.

In yet another example, a method includes providing excitation signals to an ultrasonic transducer during an excitation interval. The method includes generating, in response to a given command received via a bidirectional port, a first excitation signal sequence of the excitation interval followed by a first monitoring period to receive a first echo signal. The method includes generating, in response to the given command, a second excitation signal sequence of the excitation interval followed by a second monitoring period to receive a second echo signal. The method includes outputting results via the bidirectional port based on at least one of the first or second echo signals.

DETAILED DESCRIPTION

Figure 1:
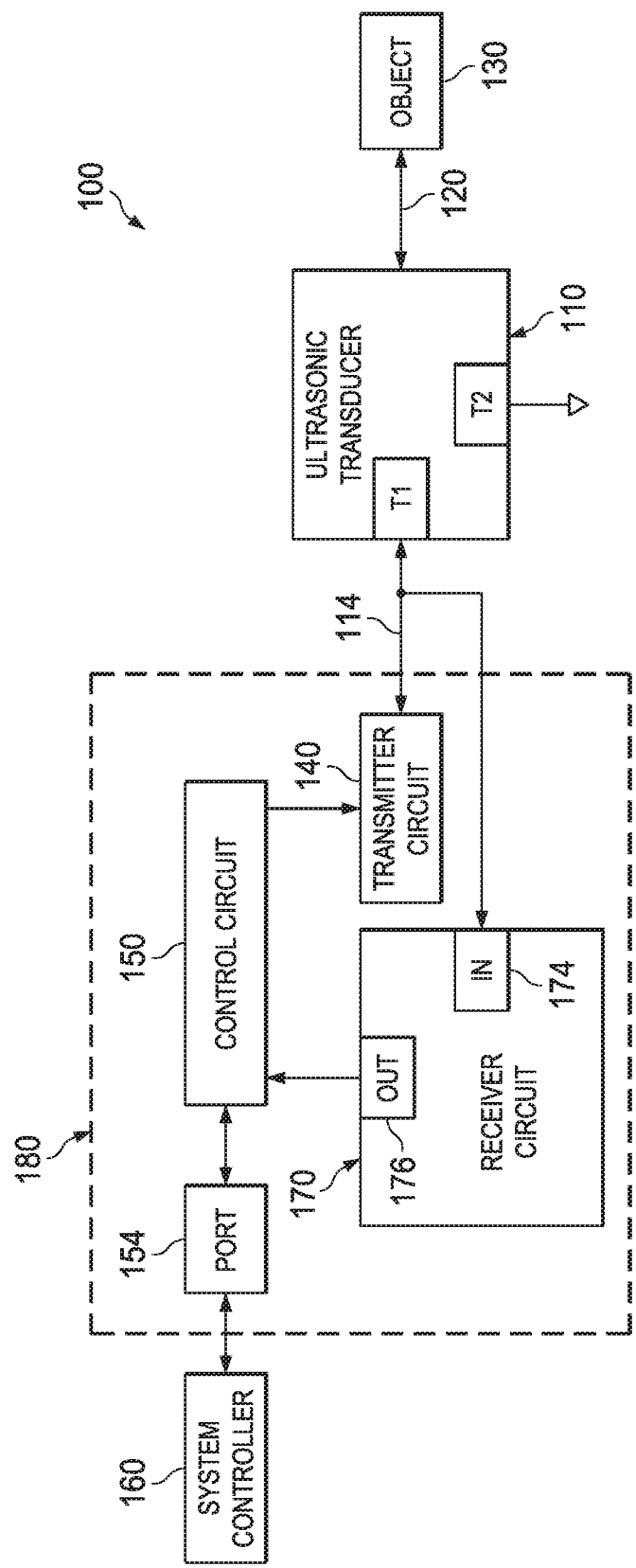
FIG. 1 illustrates an example block diagram of an ultrasonic detection circuit that provides excitation sequences in response to a command during an excitation interval to an ultrasonic transducer.

This disclosure relates to a control circuit and method to control multiple excitation signal sequences during an excitation interval for an ultrasonic transducer. For example, the control circuit includes a port to receive the command from a system controller where the command initiates a first excitation signal sequence (a burst period) followed by a first monitoring period (a listening period) to receive a first echo signal (if an object is present) in response to the first signal sequence. In response to the same command from the system controller, the control circuit subsequently automatically initiates a second excitation signal sequence (another burst period) followed by a second monitoring period (another burst period) to receive a second echo signal (if an object is present) in response to the second signal sequence. Thus, the control circuit implements multiple excitation signal sequences without additional commands (or handshaking) being issued from the system controller. Combined time of flight results indicating detected object distances can be returned from the control circuit to the system controller.

In some examples, combined time of flight results from each monitoring period are returned asynchronously to the system controller in response to the command. In another example, the time of flight results can be returned from the first monitoring period in response to the command. A sync pulse can be generated to the system controller to synchronously notify it when the second excitation signal sequence has begun which is then followed by sending time of flight results to the system controller from the second monitoring period. In yet another example, after the sync pulse has been generated indicating the start of the second signal sequence, both time of flight results from the first and second monitoring periods can be sent to the system controller during or after the second monitoring period.

The first and second excitation signal sequences can be referred to as short and long code sequences respectively where the number of transducer excitation pulses in the short sequence is less than the number of pulses in the long sequence. As opposed to some existing circuit designs that require each of the short and long sequences to be initiated by separate commands and associated handshaking with the system controller, the control circuit described herein can initiate both sequences in response to a single command which significantly reduces the processing burden of the system controller as well as reduces bus traffic. For example, the control circuit can first send two or three pulses in a short excitation sequence and monitor for received echo signals from objects for a period of time (e.g., 1 ms) during a first monitoring period. Then, the control circuit can send out a long coded sequence for the second excitation sequence and monitor for received echo signals for longer period of time (e.g., 50 ms for far-away targets). For short distances, an amplitude-based method can be provided for echo ranging and detection. For long distances, a correlation-based method can be employed for echo ranging and detection.

FIG. 1 illustrates an example of an ultrasonic detection circuit 100 that provides excitation sequences in response to a command during an excitation interval to an ultrasonic transducer 110. As used herein, the term "circuit" can include a collection of active and/or passive elements that perform a circuit function, such as an analog circuit or digital circuit. Additionally or alternatively, for example, the term "circuit" can include an integrated circuit (IC) where all or some of the circuit elements are fabricated on a common substrate (e.g., semiconductor substrate, such as a die or chip).

The circuit 100 includes or is coupled to the ultrasonic transducer 110 having a first terminal T1 and a second terminal T2. In this example, the first terminal T1 receives excitation signals at 114 and the ultrasonic transducer 110 transmits an ultrasound signal 120 in response to the excitation signals. The ultrasound signal 120 is transmitted (wirelessly) and after a period of time (e.g., time it takes for signal to propagate in air) touches an object 130 which reflects some of the ultrasound energy as an echo signal. The ultrasonic transducer 110 receives the echo signal and provides a corresponding electrical receive signal at T1. For example, a transmitter circuit 140 generates the excitation signals at 114 that is provided to the first terminal T1 of the ultrasonic transducer 110. The transmitter circuit 140 drives T1 of the ultrasonic transducer 110 at 114 during each excitation interval. The excitation interval refers to each time period during which the transmitter circuit actively drives the transducer via the excitation signals at 114.

A control circuit 150 includes a port 154 to receive a command from a system controller 160. The control circuit 150 controls the frequency and the duty cycle of the excitation signals of the transmitter circuit 140 during the excitation interval. The control circuit 150 generates a first excitation signal sequence of the excitation interval, which is followed by a first monitoring period to receive a first echo pulse in response to the command. The control circuit 150 generates a second excitation signal sequence of the excitation interval, which followed by a second monitoring period to receive a second echo pulse in response to the command. The system controller 160 generates the command to the control circuit 150 via the port 154 which causes the control circuit to initiate both the first and second excitation signal sequences during each excitation interval as well to implement the associated first and second monitoring periods, respectively.

The system controller 160 receives the results from the control circuit 150 based on at least one of the first or second echo pulses received during the excitation interval. A receiver circuit 170 has an input 174 to receive the echo pulses and an output 176 to the control circuit 150. The receiver input 174 receives the electrical receive signal from T1 of the ultrasonic transducer 110 in response to an ultrasonic echo signal reflected from the object 130. The receiver output 176 provides an amplified output signal based on the electrical receive signal. A dashed line 180 indicates that in some examples, the transmitter circuit 140, the control circuit 150, the receiver 170, and/or the port 154 can be implemented on a common substrate of an IC chip where the system controller 160 and the transducer 110 are external to the chip. In other examples, discrete circuit implementations may be provided in the system 100.

By way of example, the command from the system controller 160 can include a parameter that specifies a number of excitation pulses, an excitation pulse frequency, or an excitation pulse duty cycle for the first excitation signal sequence and second excitation signal sequence to the control circuit 150. In one example, the command can specify that the first excitation signal sequence is a short signal sequence having a lower number of excitation pulses than the second excitation signal sequence that is specified as a long signal sequence. The short signal sequence generally builds up less energy in the transducer 110 can be employed to detect objects at closer distances to the transducer. The long signal sequence is used to drive larger energy ultrasound pressure in the transducer, which can travel to detect objects that are at farther distances than those detectable by the short signal sequence.

Both excitation signal sequences (e.g., first/second, short/long) are initiated via a single command from the system controller 160. This alleviates the system controller 160 from having to initiate separate commands for both the first and second sequences to detect short and long range objects. Also, using a single command to initiate the first and second sequence reduces traffic on the communication bus as well as reduces processing time of the system controller 160 since the controller is relieved of having to handshake with the control circuit 150 after each separate command. Various examples of the short and long excitation sequences that are initiated via the command from the system controller 160 along with various processing methods are described below with respect to FIGS. 2-12.

Figure 2:
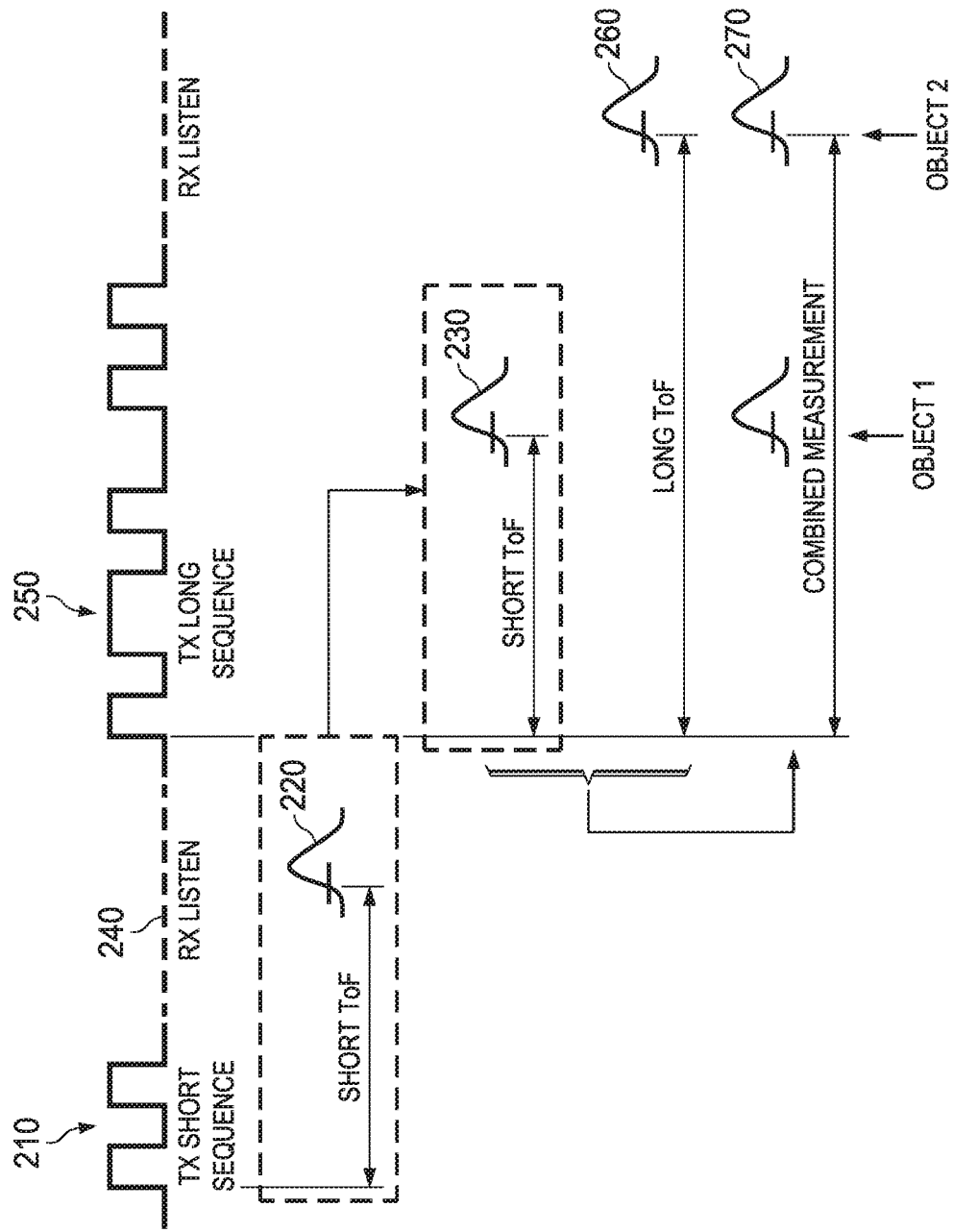
FIG. 2 illustrates an example of short and long excitation signal sequences that can be initiated during an excitation interval to an ultrasonic transducer in response to a command.

FIG. 2 illustrates an example of short and long excitation signal sequences that can be initiated during an excitation interval to an ultrasonic transducer in response to a command. A short excitation signal sequence (also referred to as short sequence) is shown at 210 that include a few excitation pulses (e.g., 2 or 3 pulses) that are provided to the ultrasonic transducer. The short sequence is used to detect objects that are close to the transducer (e.g., less than 20 cm). As shown, in response to the short sequence at 210, the transducer generates a sound pulse at 220 which travels a short time of flight distance and returns as a first echo signal 230 which is observed during a first monitoring period 240. A long sequence 250 is then generated in response to the same command that initiated the short sequence 210.

In addition to containing more excitation pulses in the long sequence 250, the long sequence can include varying the frequency and/or duty cycle of the pulses in the long excitation sequence. This is referred to as a coding signature which can be used to mitigate interference from other transducers that are nearby. An alternative to generating a coding signature is generating a tone signal for the long sequence. The tone signal can be of a single frequency at a given duty cycle (e.g., transmitting 20 short sequence pulses as the long sequence). As will be described below with respect to FIG. 8, the short sequences described herein can be staggered in time from other short sequences of nearby transducers in a multi-transducer application to mitigate interference among nearby transducers with respect to the short sequences. In response to the long sequence at 250, the transducer generates a sound pulse at 260 which travels a long time of flight distance (longer distance than from the short sequence) and returns as a second echo signal 270 which is observed during a second monitoring period 280. Combined time of flight results in response to the command can be returned to the system controller for each object detected shown as object 1 (short distance object) and object 2 (long distance object).

Figure 3:
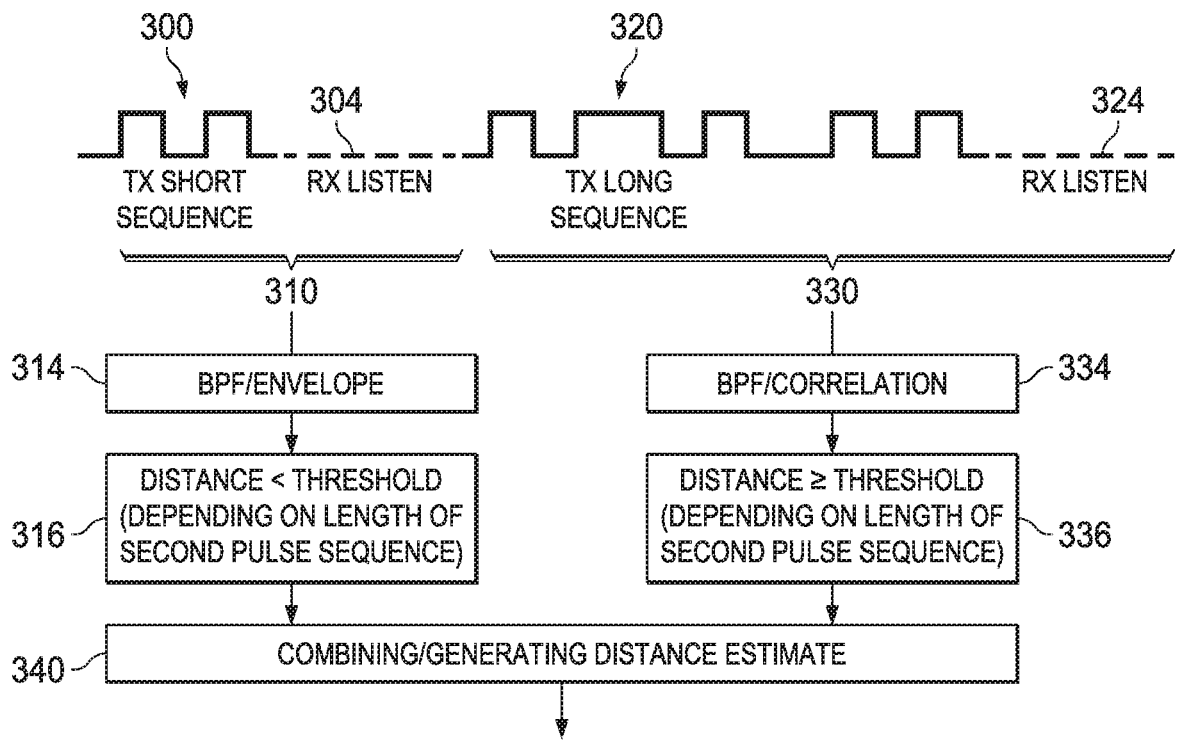
FIG. 3 illustrates an example processing method to analyze received echo signals in response to short and long excitation signal sequences.
Figure 4:
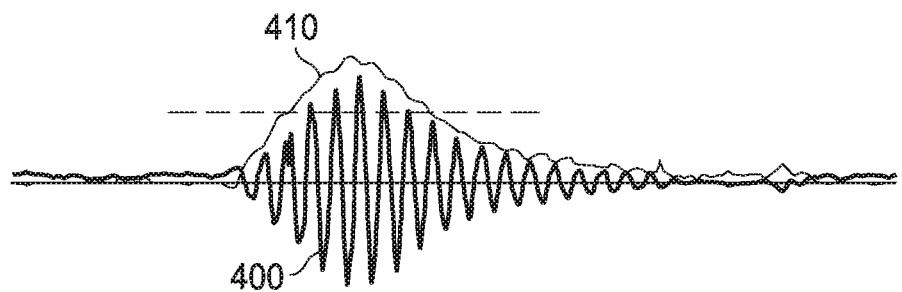
FIG. 4 is an example of a signal diagram that illustrates an echo signal and an envelope of the echo signal.
Figure 5:
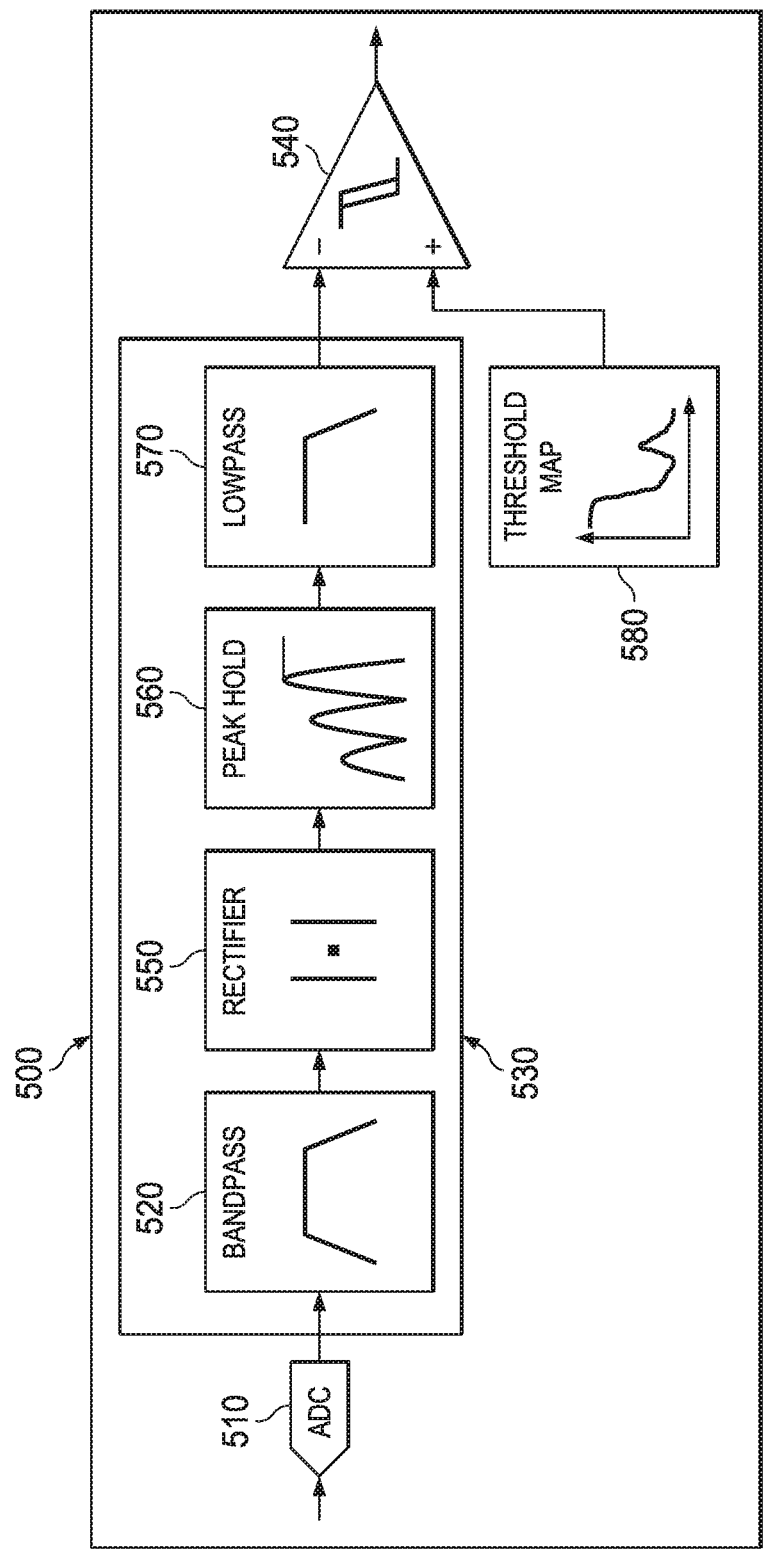
FIG. 5 is an example circuit to process an echo signal in response to a short excitation signal sequence to determine time of flight data for objects detected at short distances.

FIG. 3 illustrates example processing methods to analyze received echo signals in response to short and long excitation signal sequences. In response to a short sequence at 300 and receiving an echo signal (referred to as first echo signal) during a first monitoring period at 304, a first processing path at 310 may be executed by the control circuit described herein. The first processing path 310 can include bandpass filtering followed by an envelope detector at 314 which is processed to determine distances that are less than a given threshold at 316 (e.g., less than 20 cm). The envelope detector processes a first echo signal received in response to the short signal sequence. The envelope detector includes a rectifier and a filter to create an envelope of the first echo signal, where the envelope is compared (e.g., via comparator) to a threshold map that correlates the amplitude of the envelope over time to different object detection distances detected during the first monitoring period. An example signal is shown in FIG. 4 which shows both the echo signal and the envelope of the echo signal. An example circuit shown in FIG. 5 shows the processing at 314.

In response to a long sequence at 320 and receiving an echo signal (referred to as second echo signal) during a second monitoring period at 324, a second processing path at 330 may be executed by the control circuit described herein. The second processing path 330 can include bandpass filtering followed by a correlation engine and a correlation envelope detector at 334 which is processed to determine distances that are greater than a given threshold at 336 (e.g., greater than 20 cm). A correlation circuit in the control circuit can be provided at 334 to process the second echo signal received in response to the long signal sequence at 320.

Figure 6:
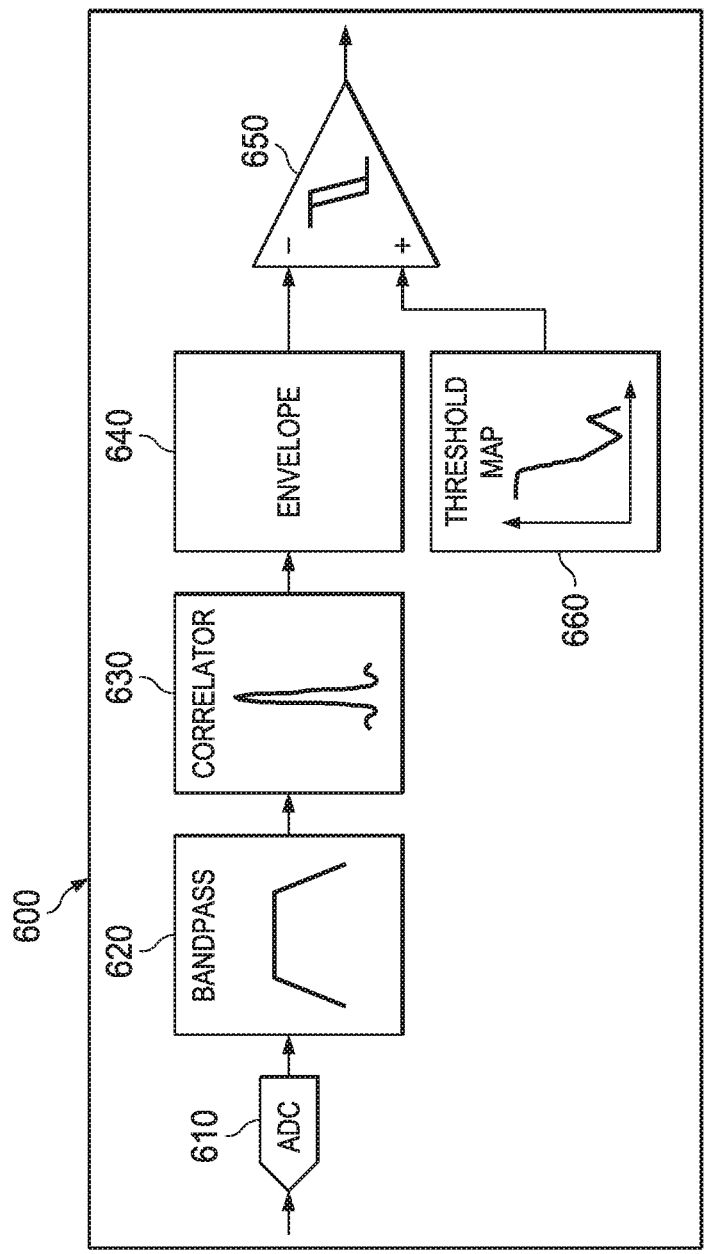
FIG. 6 is an example circuit to process an echo signal in response to a long excitation signal sequence to determine time of flight data for objects detected at long distances.

The correlation circuit includes a correlator engine and a correlator envelope detector. For example, the correlator engine convolves the long echo signal with a signal template to generate a correlator output signal that is fed to the correlator envelope detector to generate a correlator envelope of the long echo signal. The correlator envelope is compared to a threshold map that correlates the amplitude of the correlator envelope over time to different object detection distances detected during the second monitoring period. An example circuit shown in FIG. 6 shows the processing at 336. After monitoring for both short and long range objects, combined distance estimates are generated from 316 and 336 which can be returned to the system controller in response to the command.

FIG. 4 is an example of a signal diagram that illustrates an echo signal 400 and an envelope of the echo signal at 410. The echo signal 400 is a signal at a given frequency that has a time-varying amplitude. The envelope at 410 is a signal follows the outer contours of the echo signal 400 and changes with the change in amplitude of the echo signal 400. Processing circuits are shown in FIGS. 5 and 6 to generate the envelope which can be analyzed with respect to a threshold map to determine time of flight distance to a given object.

FIG. 5 is an example circuit 500 to process an echo signal in response to a short excitation signal sequence to determine time of flight data for objects detected at short distances to the circuit. The circuit 500 includes an analog to digital converter (ADC) 510 followed by a bandpass filter 520 which in turn drives an envelope circuit 530 which drives a comparator 540. The envelope circuit 530 can include a rectifier 550 followed by a peak hold block 560 which feeds a low pass filter 570 to generate the envelope from the short echo signal. The circuit 500 can be employed to generate the envelope since the short echo signal is a single tone (e.g., pulse duty cycle and frequency unchanging). The bandpass filter 520 can be an infinite impulse response filter (e.g., $2^{nd}$ order). The rectifier 550 can take the absolute value of its input where peak hold block holds a peak value of the sinusoidal echo signal which is then followed by the low pass filter 570 to generate the envelope. In another example of the circuit 530 the peak hold block 560 is not used instead the circuit 530 includes a Hilbert filter followed by the rectifier 550 which then drives the low pass filter 570 to generate the envelope at the comparator 540. The comparator 540 compares a threshold map at 580 where the threshold changes with time in accordance with the envelope which correlates to the echo amplitude at different distances.

FIG. 6 is an example circuit 600 to process an echo signal in response to a long excitation signal sequence to determine time of flight data for objects detected at long distances to the circuit. The circuit 600 includes an analog to digital converter (ADC) 610 followed by a bandpass filter 620 which drives a correlator engine 630. The correlator engine 630 drives a correlator envelope circuit 640 which drives a comparator 650. The envelope circuit 640 can operate like the envelope circuit 530 described above with respect to FIG. 5. The circuit 600 can be employed to generate the envelope from long echo signals since the long echo signal is from multiple tones (e.g., varying pulse duty cycle and/or frequency). The correlator engine 630 convolves the input echo signal with the transmitter signal template which is generated from the long signal sequence (e.g., a correlator filter with filter coefficients defined by the transmitter signal template). The comparator 650 compares a threshold map at 660 where the threshold changes with time in accordance with the envelope which correlates to the echo amplitude at different distances.

Figure 7:
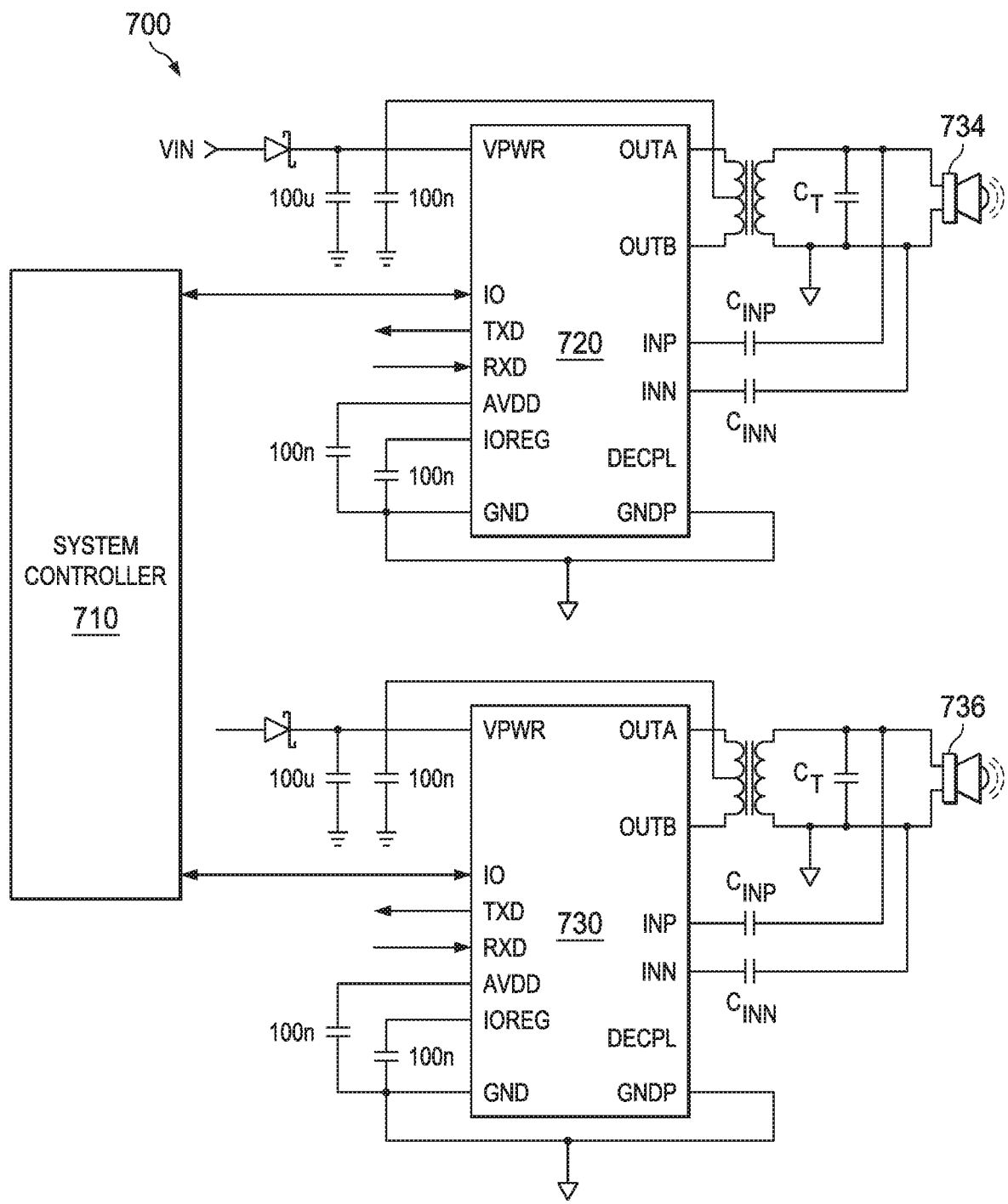
FIG. 7 illustrates an example of an ultrasonic detection system that includes a system controller to that provides commands to multiple ultrasonic detection circuit that control multiple ultrasonic transducers.

FIG. 7 illustrates an example of an ultrasonic detection system 700 that includes a system controller that provides commands to multiple ultrasonic detection circuits 720 and 730 that control multiple ultrasonic transducers 734 and 736, respectively. As shown, each of the detection circuits 720 and 730 can include an I/O port to receive the commands described herein. The ports can include a single serial port, a parallel port, or a combination of serial and parallel ports. The system controller 710 issues the commands to the ports, where control circuits (not shown) in the circuits 720 and 730 returns the results as time of flight data relating to detected object distances during the first or second monitoring periods in response to the command from the controller. In one example, the system controller 710 initiates the commands to each of the ultrasonic detection circuits at different times to mitigate interference between each of the ultrasonic detection circuits. An example of this staggering of commands is illustrated and described below with respect to FIG. 8. In another aspect, the system controller 710 issues parameter commands for different code signatures to each of the control circuits of each ultrasonic detection circuits 720 and 730, the code signatures have different pulse sequences and duty cycles to mitigate interference between each of the ultrasonic detection circuits. It is noted that the system controller can communicate with more than the two ultrasonic detection circuits than shown in the example system 700.

Figure 8:
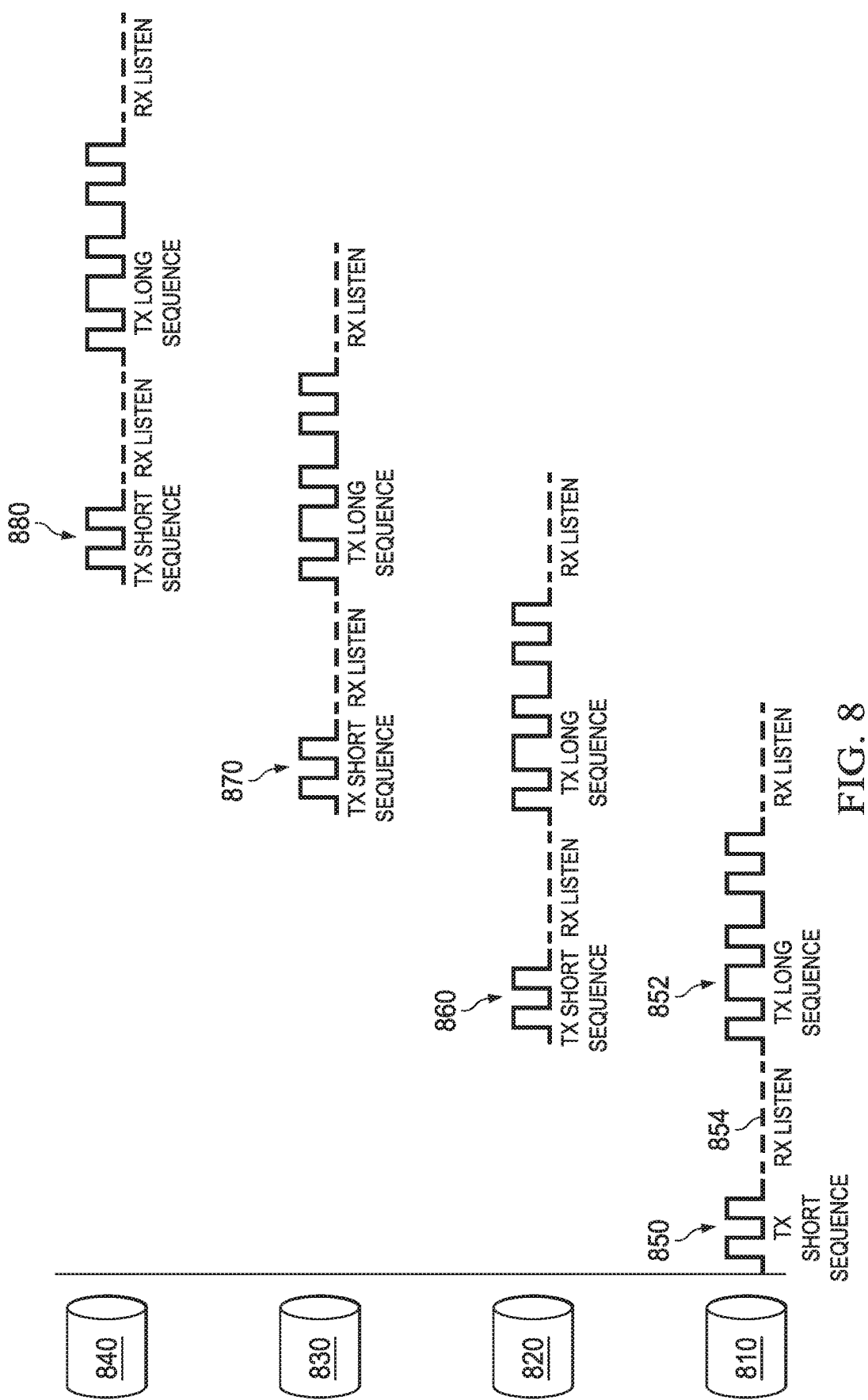
FIG. 8 illustrates an example diagram illustrating staggering of short excitation sequences and coding of long signal sequences to mitigate interference between multiple ultrasonic transducers.

FIG. 8 illustrates an example diagram illustrating staggering of short excitation sequences and coding of long signal sequences to mitigate interference between multiple ultrasonic transducers shown at 810 though 840. In this example, a first signal sequence at 850 followed by a second signal sequence at 852 is provided to the transducer 810. After a first monitoring period of 854, another set of signals sequences can be initiated at 860 to excite transducer 820. Similarly, signal sequences at 870 and at 880 can be initiated at later points in time. By staggering the short sequences to each transducer in time such that a subsequent short signal sequence to a transducer does not occur before the monitoring period of the previously excited transducer concludes, interference between short signal sequences to the multiple transducers can be mitigated. With respect to long signal sequences, the coding signatures described herein provide uniqueness between multiple transducer signals such that the long signal sequences do not substantially interfere with each other and/or with other short signal sequences.

Figure 9:
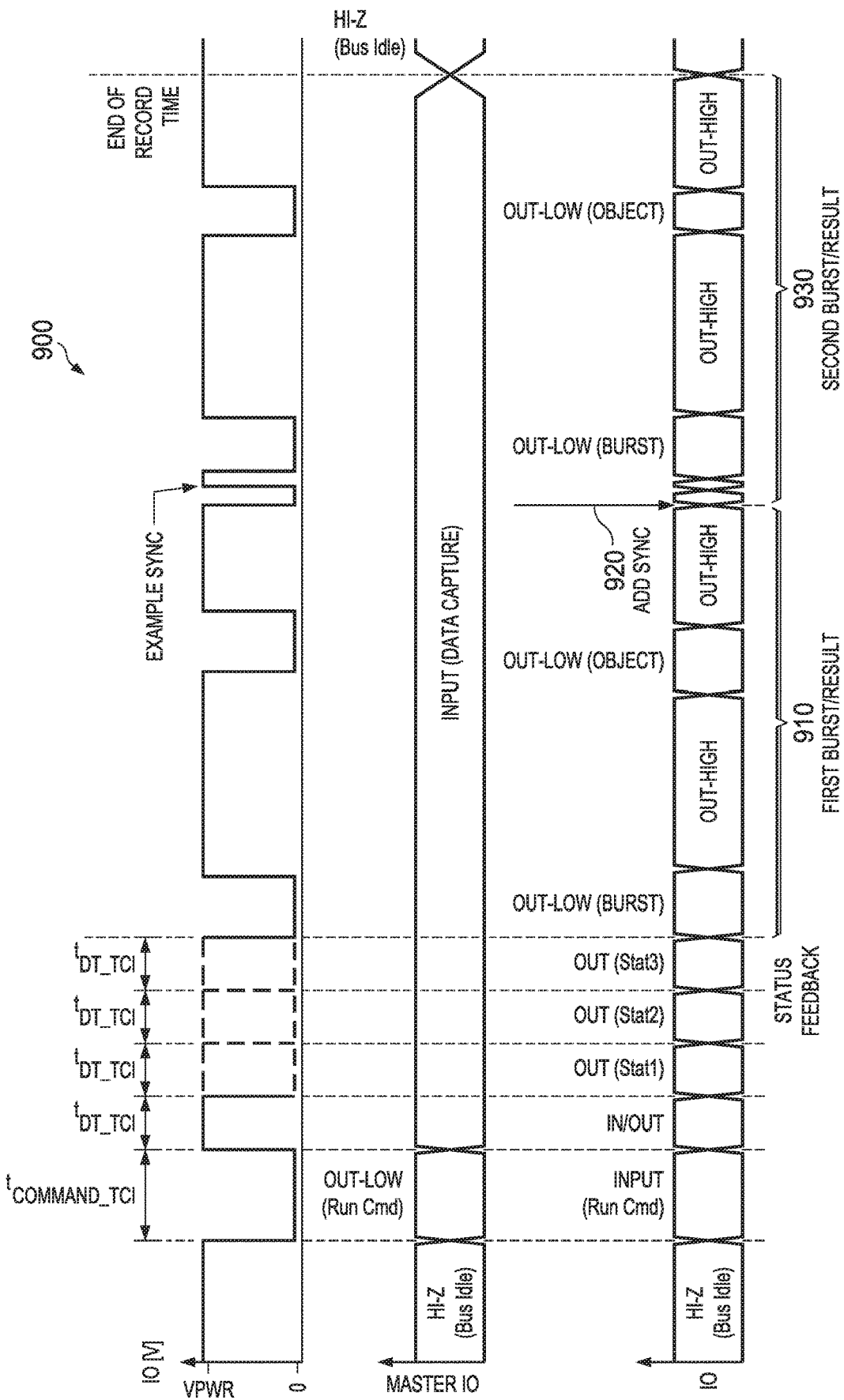
FIG. 9 illustrates an example of a synchronous communication between a system controller and an ultrasonic detection circuit.

FIG. 9 illustrates an example timing diagram 900 for signals communicated via a synchronous communications between a system controller and an ultrasonic detection circuit. Before proceeding with a discussion of the interface 900, the system controller described herein can asynchronously receive combined results via the port from the first and second monitoring periods in response to a single command (e.g., via a universal synchronous receiver transmitter (UART) in the control circuit IC). For instance, if a UART interface is provided, combined time of flight results can be reported. The combined results relate to time of flight data (e.g., time in milliseconds) for when a given echo is received with respect to when the first and second excitation/burst sequences were generated. Thus, with respect to the UART interface, both the first and second excitation/monitoring periods (also referred to as burst/listen periods) can be initiated and completed before reporting combined results after the second monitoring period (listen) has ended.

Synchronous communications of the time of flight information is also possible. This type of interface can be referred to as a time of command (TOC) interface where time of flight results are not reported directly such as in the UART case, but rather I/O lines are toggled to notify the system controller when a given excitation/burst sequence begins and toggled again after a given echo has been received (e.g., during monitoring/listening period) in response to the excitation/burst. The system controller can then compute the time of flight data from the time that the I/O line was toggled to start a given excitation/burst sequence and toggled to indicate that an echo was received during a given monitoring/listening period. In the synchronous TOC example of FIG. 9, the system controller receives a first time of flight result from a first excitation (burst) and monitoring period (listen) shown at 910 which is communicated via an I/O port. The system controller receives a sync pulse at 920 from the control circuit to synchronously notify the system controller when the second excitation signal sequence begins. The control circuit then provides a second time of flight result via a toggling of the I/O line to the system controller via the port during the second monitoring period at 930.

Figure 10:
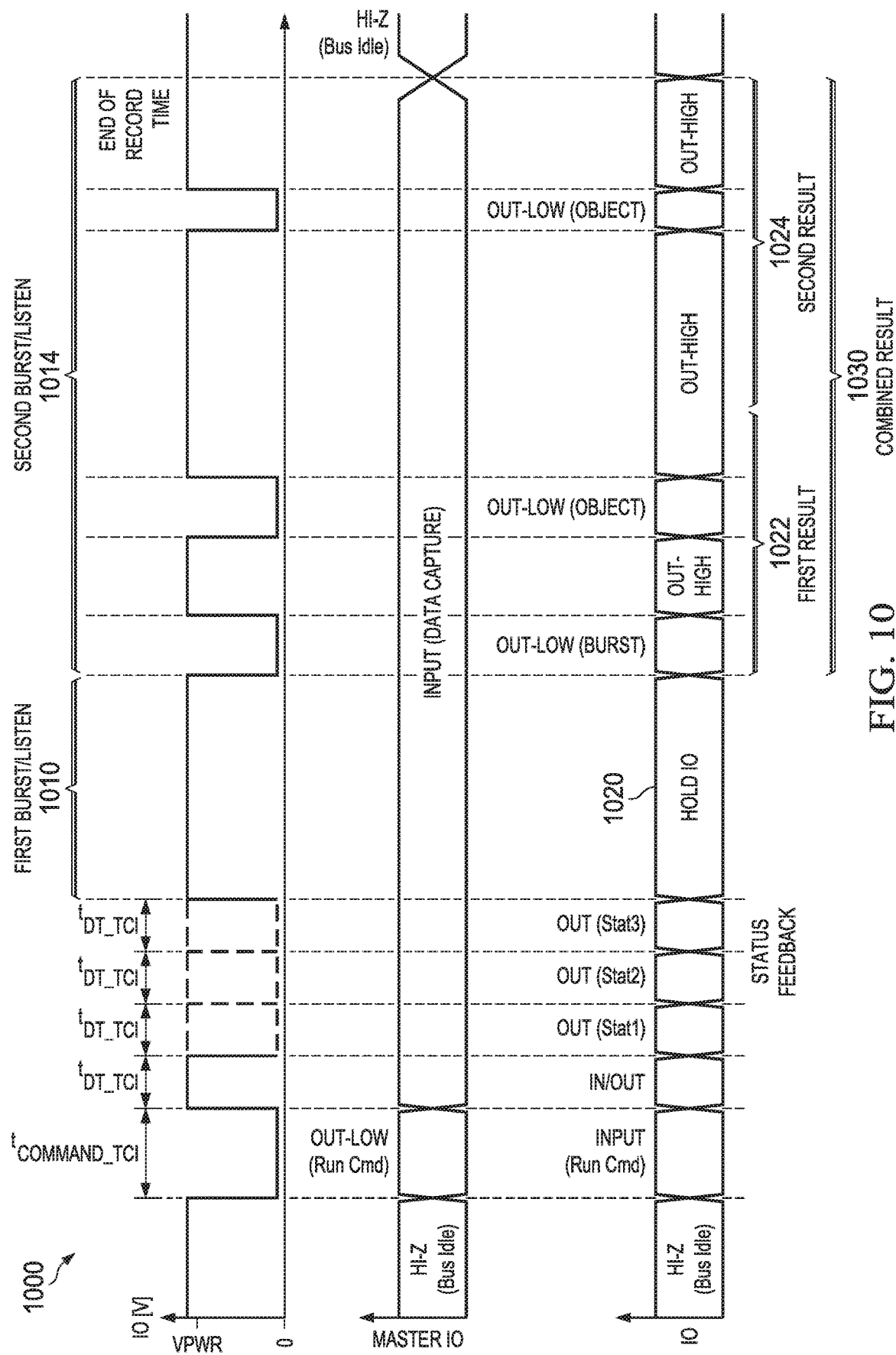
FIG. 10 illustrates an alternative example of a synchronous communication between a system controller and an ultrasonic detection circuit.

FIG. 10 illustrates an alternative example of a timing diagram 1000 of synchronous communications between a system controller and an ultrasonic detection circuit. A first burst (excitation) and listening (monitoring) period 1010 is followed by a second burst and listening period 1014. In this example, the system controller receives a sync pulse from the control circuit to synchronously notify the system controller when the second period begins at 1014. While the first period begins at 1010, a first result is not reported at 1020 via a toggling of the I/O line. After the first listening/monitoring period has completed and the second listening/monitoring period has started, a first result 1022 is reported by toggling the I/O line, followed by a second result 1024, where the first result 1022 and the second result 1024 represent combined time of flight results 1030.

Figure 11:
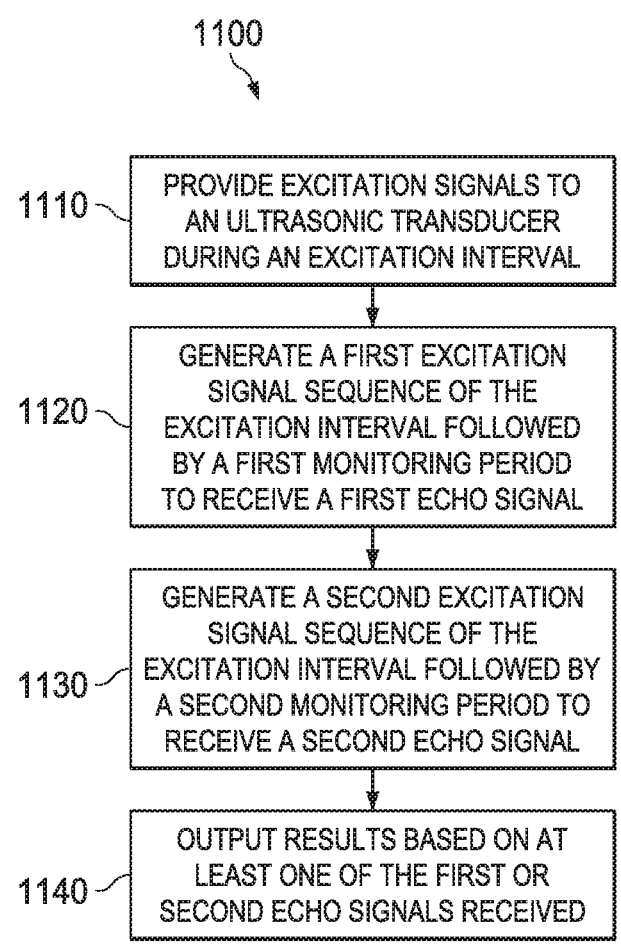
FIG. 11 illustrates an example method that provides excitation sequences in response to a command during an excitation interval to an ultrasonic transducer.

In view of the foregoing structural and functional features described above, an example method will be better appreciated with reference to FIG. 11. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be implemented by various hardware circuits and other components configured to perform the functions shown and described.

FIG. 11 illustrates an example method 1100 that provides excitation sequences in response to a command during an excitation interval to an ultrasonic transducer. At 1110, the method 1100 includes providing excitation signals to an ultrasonic transducer during an excitation interval (e.g., via transmitter circuit 140 of FIG. 1). At 1120, the method 1100 includes generating, in response to a given command received via a bidirectional port, a first excitation signal sequence of the excitation interval followed by a first monitoring period to receive a first echo signal (e.g., via control circuit 150 and transmitter circuit 140 of FIG. 1). At 1130, the method 1100 includes generating, in response to the given command, a second excitation signal sequence of the excitation interval followed by a second monitoring period to receive a second echo signal (e.g., via control circuit 150 and transmitter circuit 140 of FIG. 1). At 1140, the method 1100 includes outputting results via the bidirectional port based on at least one of the first or second echo signals received (e.g., via control circuit 150 of FIG. 1). Although not shown, the method 1100 can also include comparing an envelope derived from the first or second echo signals to a threshold map that correlates the amplitude of the envelope over time to different object detection distances detected during the first or second monitoring periods.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system, comprising:
    a transmitter circuit having a control input and a transmitter output, the transmitter output adapted to be coupled to an ultrasonic transducer, the transmitter circuit configured to provide first and second excitation signal sequences to the ultrasonic transducer during an excitation interval, the first and second excitation signal sequences having a frequency and a duty cycle controlled by the control input; and
    control circuitry having a bidirectional port, a control output and a receiver input, the control output coupled to the control input, the receiver input adapted to be coupled to the ultrasonic transducer, and the bidirectional port configured to receive a command and to output results, the control circuitry configured to, responsive to the command;
    control the frequency and the duty cycle via the control output;
    provide the first excitation signal sequence to the transmitter circuit at the control output;
    after the transmitter circuit provides the first excitation signal sequence to the ultrasonic transducer, receive a first echo signal at the receiver input during a first monitoring period;
    provide the second excitation signal sequence to the transmitter circuit at the control output;
    after the transmitter circuit provides the second excitation signal sequence to the ultrasonic transducer, receive a second echo signal at the receiver input during a second monitoring period; and
    output the results via the bidirectional port based on at least one of the received first or second echo signals.

2. The system of claim 1, wherein the command includes a parameter that specifies a number of excitation pulses, an excitation pulse frequency or an excitation pulse duty cycle for the first excitation signal sequence.

3. The system of claim 2, wherein the parameter is a first parameter, and the command includes a second parameter that specifies a number of excitation pulses, an excitation pulse frequency or an excitation pulse duty cycle for the second excitation signal sequence.

4. The system of claim 3, wherein the transmitter circuit is configured to provide the second excitation signal sequence having a varying frequency or a varying duty cycle.

5. The system of claim 3, wherein the transmitter circuit is configured to provide the second excitation signal sequence having a single frequency or a single duty cycle.

6. The system of claim 1, wherein the command specifies that the first excitation signal sequence has a lower number of excitation pulses than the second excitation signal sequence.

7. The system of claim 6, wherein the control circuitry includes an envelope circuit configured to process the received first echo signal, the envelope circuit includes a rectifier and a filter configured to create an envelope of the first echo signal, and the control circuitry is configured to detect object distances during the first monitoring period and to compare the envelope to a threshold map that correlates an amplitude of the envelope over time to the detected object distances.

8. The system of claim 6, wherein the control circuitry includes a correlation circuit configured to process the received second echo signal, the correlation circuit includes a correlator engine and a correlator envelope circuit, the correlator engine is configured to convolve the second echo signal with a signal template to generate a correlator output signal and to provide the correlator output signal to the correlator envelope circuit, the correlator envelope circuit is configured to generate a correlator envelope of the second echo signal, and the control circuitry is configured to detect object distances during the second monitoring period and to compare the correlator envelope to a threshold map that correlates an amplitude of the correlator envelope over time to the detected object distances.

9. The system of claim 1, wherein:
    the bidirectional port is adapted to be coupled to a system controller;
    the bidirectional port is configured to receive the command from the system controller and to output the results to the system controller; and
    the control circuitry is configured to, responsive to the command, detect object distances during the first or second monitoring periods, and output the results as time of flight data related to the detected object distances.

10. The system of claim 9, wherein the results include first and second time of flight results, the first time of flight result is from the first monitoring period, the second time of flight result is from the second monitoring period, and the control circuitry is configured to provide a sync pulse to the system controller via the bidirectional port to notify the system controller when the second excitation signal sequence begins.

11. The system of claim 9, wherein the control circuitry is configured to output the first and second time of flight results to the system controller via the bidirectional port during the second monitoring period.

12. The system of claim 1, wherein the first echo signal is a first echo pulse, and the second echo signal is a second echo pulse.

13. The system of claim 1, wherein the bidirectional port is adapted to be coupled to a system controller and is configured to receive the command from the system controller and to output the results to the system controller.

14. The system of claim 13, wherein the control circuitry is first control circuitry, the bidirectional port is a first bidirectional port, the command is a first command, and the system further comprises:
  second control circuitry having a second bidirectional port adapted to be coupled to the system controller, the second bidirectional port configured to receive a second command from the system controller at a time that differs from the first bidirectional port receiving the first command, in order to mitigate interference.

15. The system of claim 14, wherein the first and second commands specify different pulse sequences and duty cycles, in order to mitigate interference.

\* \* \* \* \*